United States Patent
Flockhart et al.

(10) Patent No.: US 6,766,013 B2
(45) Date of Patent: Jul. 20, 2004

(54) TIMELY SHUT-DOWN OF A REAL-TIME WORK CENTER

(75) Inventors: Andrew D. Flockhart, Thornton, CO (US); Robin H. Foster, Little Silver, NJ (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 425 days.

(21) Appl. No.: 09/874,634

(22) Filed: Jun. 5, 2001

(65) Prior Publication Data

US 2002/0181692 A1 Dec. 5, 2002

(51) Int. Cl.[7] .............................................. H04M 3/00
(52) U.S. Cl. .............................. 379/265.02; 379/265.04
(58) Field of Search ....................... 379/265.02, 265.01, 379/266.1, 309

(56) References Cited

U.S. PATENT DOCUMENTS

| | | | |
|---|---|---|---|
| 4,858,120 A | * | 8/1989 | Samuelson ................... 364/401 |
| 5,740,238 A | | 4/1998 | Flockhart et al. ............ 379/221 |
| 5,787,163 A | * | 7/1998 | Taylor et al. ................ 379/265 |
| 6,356,632 B1 | * | 3/2002 | Foster et al. ........... 379/265.04 |

FOREIGN PATENT DOCUMENTS

| | | | |
|---|---|---|---|
| EP | 1 017 216 | 7/2000 | ............. H04M/3/51 |
| EP | 1 035 717 | 9/2000 | ........... H04M/3/523 |

* cited by examiner

Primary Examiner—Ahmad F. Matar
Assistant Examiner—Marie C. Ubiles
(74) Attorney, Agent, or Firm—David Volejnicek

(57) ABSTRACT

A call center (100) rejects further calls when the sum of the present time, the anticipated call in-queue wait time (112), and the anticipated call service time (114) for this type (106–108) of call exceeds the closing time of the call center. The call center may redirect the rejected calls to another call center if it determines that the other call center can service them by its closing time.

16 Claims, 2 Drawing Sheets

TIMELY SHUT-DOWN OF A REAL-TIME WORK CENTER

TECHNICAL FIELD

This invention relates to real-time work centers in general and to call centers in particular.

BACKGROUND OF THE INVENTION

One of the problems of managing a real-time work center is deciding when to allow new work to enter the center and when to deny entry. For example, given a call center that does not operate around-the-clock, customer calls to the call center that occur near the call center's closing time must be either refused or diverted to another call center if the calls are not expected to be answered and/or completed by the scheduled closing time.

In the prior art, this is typically done by vector programming, where a fixed time is chosen for ceasing to accept new calls, e.g., ten minutes before closing time. For example, one known system can be structured to have pre-programmed closing/opening times in its scripts that either control call distribution in a multi-site environment or control call distribution to various skills in a single-site environment. There are serious flaws with this approach. For example, for a skill with an average call-handling time of three minutes, if ten minutes before the closing time there are no calls in queue and agents are available, then seven minutes of potentially productive work time will be lost. Conversely, if ten minutes before closing time the call wait-time in queue is 15 minutes, then either agents will have to work eight minutes beyond the closing time to handle old waiting calls, or already-enqueued calls will have to be abandoned.

Another known approach is to have a "closing" skill defined into which a manager of a call center logs in to close the center and logs out of to open the center. In vectoring, if there are agents logged in to the "closing" skill, the center (or a part of it) is assumed to be closed.

To determine the opening/closing of the call center, the "closing" skill is monitored. If the "closing" skill is staffed, the site cannot take a call. If the "closing" skill is not staffed, and if there are "sufficient" resources to support a predictable level of operation (e.g., if there are more than a predetermined minimum number of agents logged into the call center), the center is considered open. This approach leaves open the question of when the manager should log into the "closing" skill to close the call center.

SUMMARY OF THE INVENTION

This invention is directed to solving these and other problems and disadvantages of the prior art. Generally, according to the invention, acceptance or rejection of new work at a work center is conditioned on whether the work arrival time plus anticipated wait time and service time for this type of work exceeds the work center's closing time by some margin (e.g. a predetermined amount of time, down to and including zero).

According to the invention, a method of operating a work center comprises determining if a sum of arrival time plus anticipated wait time plus anticipated service time of a work item exceeds a closing time of the work center by a margin, and then accepting or rejecting the work item depending on whether it is determined that the sum does or does not exceed the closing time by the margin. The margin is illustratively nil. Preferably, these considerations are made separately for each type of work item serviced by the work center, e.g., individually for each skill/split served by a call center. Also preferably, the rejecting comprises redirecting the work item to another work center if it is determined that the other work center can service the work item by its closing time. The invention thus ensures that the work center will likely complete servicing of waiting work items by its closing time, without unnecessarily refusing work items whose servicing can likely be completed by the work center's closing time.

While the invention has been characterized in terms of a method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

These and other features and advantages of the invention will become apparent from the following description of an illustrative embodiment of the invention considered together with the drawing.

DETAILED DESCRIPTION

Figure 1:
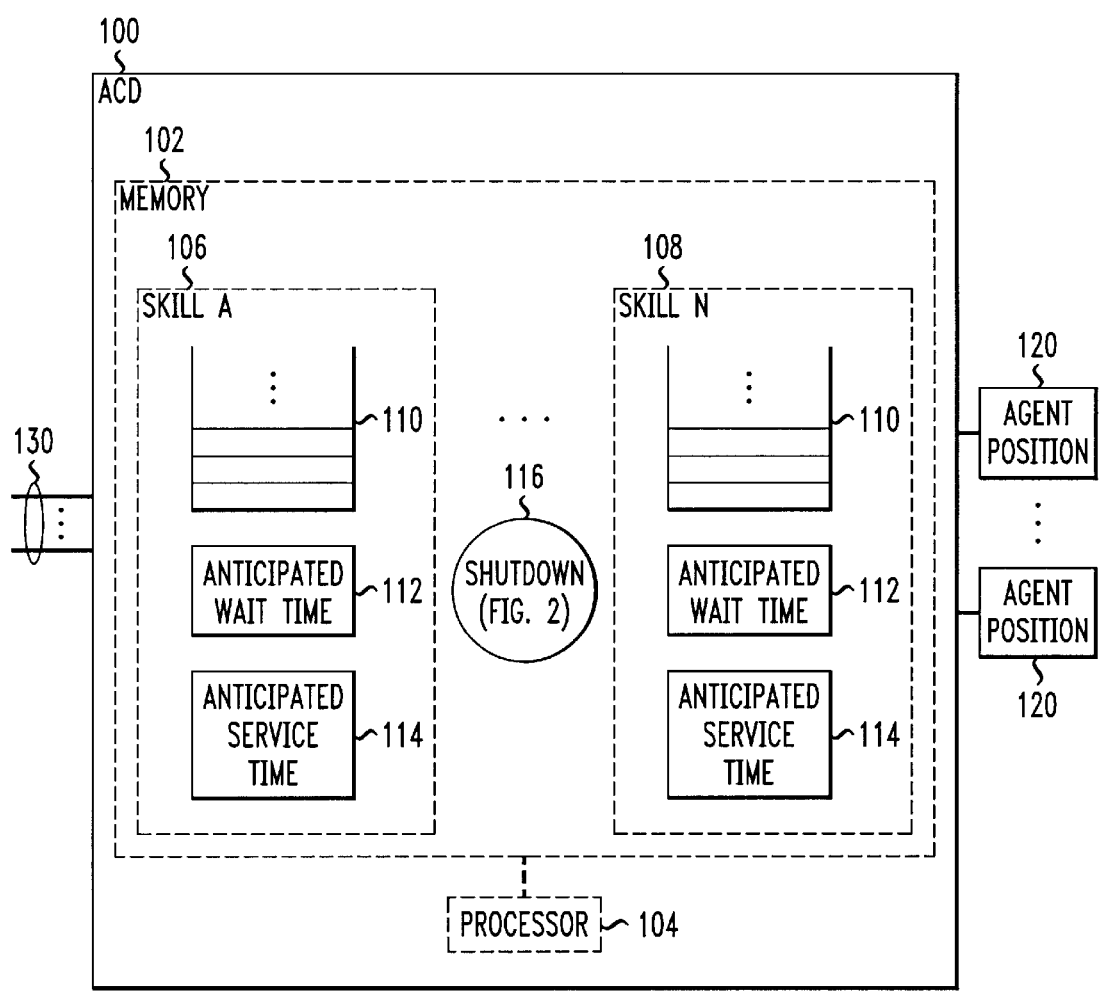
FIG. 1 is a block diagram of a call center that includes an illustrative embodiment of the invention.

FIG. 1 shows a work center that includes an illustrative embodiment of the invention. The work center is illustratively a customer contact center such as a call center comprising an automated call distributor (ACD) 100 that serves a plurality of agent positions 120. Customer communications such as calls incoming and/or outgoing on trunks 130 are distributed by ACD 100 for servicing among agent positions 120. ACD 100 is a stored-program-controlled machine comprising at least one memory 102 for storing programs and data and a processor 104 for executing the programs and using the data. ACD 100 is illustratively the Definity® enterprise communications system of Avaya Inc. Included among contents of memory 102 are call queues 110 for buffering calls that are waiting to be serviced, one queue 110 for each split or skill 106–108 handled by call center 100. Associated with each skill 106–108 is also an expected or anticipated wait time 112 that indicates how long a call can be expected to wait in the corresponding queue 110 before being assigned to an agent position 120 for servicing, and/or an anticipated average service time 114 that indicates how long on average it takes an agent position 120 to service this type of call. As described so far, the call center of FIG. 1 is conventional.

Figure 2:
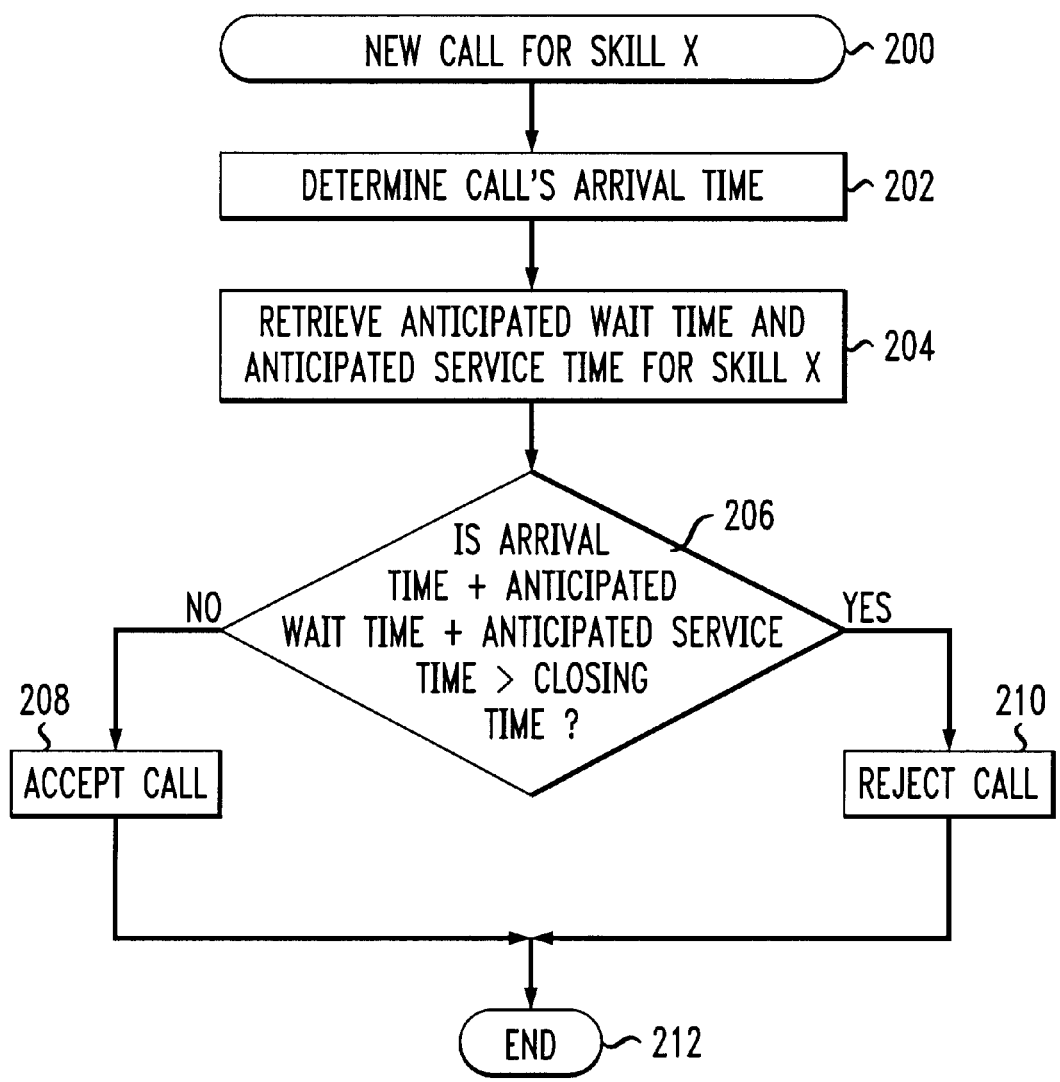
FIG. 2 is a functional flow diagram of operation of a shutdown program of the call center of FIG. 1.

According to the invention, memory 102 of ACD 100 includes a shutdown program 116 that decides when to cease accepting new calls for each skill 106–108 as the closing time of call center 100 approaches. The functionality of shutdown program 116 is shown in FIG. 2.

Execution of shutdown program 116 is invoked when a new call arrives for a skill x (one of the skills 106–108), at step 200. Program 116 determines the call's arrival time (the present time), at step 202, and retrieves anticipated wait time 112 and anticipated service time 114 for skill x, at step 204. Program 116 then sums these three times and compares the sum against the closing time of the call center, at step 206. If the sum does not exceed the closing time, program 116 indicates acceptance of the call to ACD 100, at step 208, whereupon ACD 100 proceeds to enqueue the call in queue 110 of skill x and/or assign the call to an agent position 120 for processing. If the sum exceeds the closing time, program 116 indicates rejection of the call to ACD 100, at step 210, whereupon ACD 100 proceeds either to play a rejection announcement to the call or to redirect the call to an alternative call center. Following step 208 or 210, execution of program 116 ends, at step 212.

In the just-described embodiment, the tolerable margin for exceeding the closing time is assumed to be nil. In an alternative embodiment, a non-zero margin may be tolerated, such that the determination at step 208 becomes whether the sum exceeds the closing time by more than the tolerable margin. The tolerable margin may either be predetermined and fixed, or it may be dynamically computed by the system based on current data of the call center.

In a multi-site (multi-call center) arrangement, each call center must know its own operational hours. If the (arrival time+anticipated wait time+anticipated service time) of a call placed in a queue 110 of the call center would exceed the closing time of the call center, the call should not be enqueued there, in order that all pending work have a good chance of being completed by closing time. (This could be a call that originally arrived at this call center, or one that was redirected from another call center.) Instead, the call should be rejected or enqueued at another call center, even if the other call center would predict a longer wait in queue. Alternatively, the (arrival time+anticipated wait time) must not exceed the closing time of the call center.

The call center with an upcoming closing could reply to a remote call center that is seeking to relocate a call that the wait time is infinite, that the call is rejected (send a reason code) and/or with a projected re-opening time. This information does not mean that a remote call center cannot try again to relocate a call to the closing call center.

In addition, it should be possible as well to maintain an opening and closing schedule on a per-skill basis at each call center, to take care of situations in which not all skills are supported at each call center at all times, but some skills are available (a partial closing, for example, where some of the main skills are staffed but some of the less common skills are not.) Additionally, if each call center has knowledge of operational hours and the average service times by skill across all call centers, then each call center can complete the evaluation of the suitability of a remote call center based upon only the anticipated caller wait time being provided by the remote call center.

Additionally, the caller may hear a busy tone or an announcement such as "Please call tomorrow" when the [arrival time+anticipated wait time+anticipated service time] exceeds the closing time.

Also, reporting capabilities may identify calls, skills, and call centers affected by these rules so that system managers are aware of the logic being invoked. In addition, the real-time nature of this logic would allow for real-time display of enterprise operations indicating where redirection has been discontinued due to shutdown conditions, on a skill-by-skill basis.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of operating a work center comprising:

determining if a sum of arrival time plus anticipated wait time plus anticipated service time of a work item exceeds a closing time of the work center by a threshold amount;

if the sum is determined to exceed the closing time by more than the threshold amount, rejecting the work item; and if the sum is determined not to exceed the closing time by more than the threshold amount, accepting the work item.

2. The method of claim 1 wherein:

the threshold amount is nil.

3. The method of claim 1 wherein:

determining comprises determining if the sum of arrival time plus anticipated wait time plus anticipated service time of a work item of one of a plurality of types of work item exceeds a closing time of the work center for the one type of work item by a threshold amount for the one type of work item;

rejecting comprises rejecting the work item of the one type; and accepting comprises accepting the work item of the one type.

4. The method of claim 3 wherein:

the threshold amount for the one type of work item is nil.

5. The method of claim 1 wherein:

determining comprises effecting said determining in response to arrival of the work item at the work center.

6. The method of claim 1 wherein:

accepting comprises enqueuing the work item at the work center; and rejecting comprises refusing to accept the work item at the work center.

7. The method of claim 1 wherein:

rejecting comprises redirecting the work item to another work center.

8. The method of claim 1 wherein:

rejecting comprises determining if a second sum of arrival time plus anticipated wait time plus anticipated service time of the work item at another work center would exceed a closing time of the other work center by a threshold amount of the other work center;

if the second sum is determined to exceed the closing time of the other work center by more than the threshold amount of the other work center, rejecting the work item; and if the second sum is determined not to exceed the closing time of the other work center by more than the threshold amount of the other work center, redirecting the work item to the other work center.

9. The method of claim 8 wherein:

the threshold amount of the other work center is nil.

10. The method of claim 1 wherein:

the work center comprises a call center; and the work item comprises a call.

11. A method of operating a customer contact center comprising:

in response to arrival of a customer communication of one of a plurality of types of customer communications served by the center, determining if a sum of arrival time plus anticipated wait time plus anticipated service time of the communication of the one type exceeds a closing time of the center for communications of the one type;

in response to determining that the sum does not exceed the closing time, enqueuing the communication of the one type for servicing at the center; and in response to determining that the sum exceeds the closing time, refusing to accept the communication for servicing at the center.

12. The method of claim 11 wherein:

refusing comprises
  in response to determining that the sum exceeds the closing time, determining if a second sum of arrival time plus anticipated wait time plus anticipated service time of the communication of the one type exceeds a closing time of a second customer contact center for communications of the one type;
  in response to determining that the second sum does not exceed the closing time of the second center, redirecting the communication for servicing to the second center; and
  in response to determining that the second sum exceeds the closing time of the second center, rejecting the communication for servicing.

13. An apparatus that effects the method of one of the claims 1–12.

14. A computer-readable medium containing executable instructions representing a computer program which, when executed in a computer, causes the computer to function in the fashion of one of the claims 1–12.

15. An apparatus comprising:

an effector of determining if a sum of arrival time plus anticipated wait time plus anticipated service time of a work item at a work center exceeds a closing time of the work center by a threshold amount; and an effector, responsive to a determination that the sum exceeds the closing time by more than the threshold amount, of causing the work center to reject the work item, and further responsive to a determination that the sum does not exceed the closing time by more than the threshold amount, of causing the work center to accept the work item.

16. The apparatus of claim 15 wherein:

the threshold amount is nil.

\* \* \* \* \*